United States Patent
Ichikawa

(10) Patent No.: US 8,948,571 B2
(45) Date of Patent: Feb. 3, 2015

(54) RECEIVER, SHUTTER GLASSES, AND COMMUNICATION SYSTEM

(75) Inventor: Takeshi Ichikawa, Kanagawa (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 494 days.

(21) Appl. No.: 13/430,364

(22) Filed: Mar. 26, 2012

(65) Prior Publication Data

US 2012/0249884 A1 Oct. 4, 2012

(30) Foreign Application Priority Data

Mar. 31, 2011 (JP) ................................. 2011-078045

(51) Int. Cl.
| | |
|---|---|
| *H04N 9/80* | (2006.01) |
| *H04N 13/00* | (2006.01) |
| *H04N 5/765* | (2006.01) |
| *H04N 5/932* | (2006.01) |
| *H04N 5/935* | (2006.01) |
| *H04N 5/931* | (2006.01) |
| *H04L 1/00* | (2006.01) |
| *H04N 13/04* | (2006.01) |
| *H04L 1/16* | (2006.01) |

(52) U.S. Cl.
CPC ............... *H04L 1/0061* (2013.01); *H04L 1/16* (2013.01)
USPC ............. 386/239; 348/42; 348/51; 348/56; 386/200; 386/201; 386/202; 386/203; 386/208

(58) Field of Classification Search
USPC ............. 386/200, 201, 202, 203, 208, 239; 348/42, 51, 56
See application file for complete search history.

(56) References Cited

U.S. PATENT DOCUMENTS

| | | | | |
|---|---|---|---|---|
| 2011/0122238 | A1* | 5/2011 | Hulvey et al. | 348/56 |
| 2011/0134226 | A1* | 6/2011 | Kim | 348/51 |
| 2011/0134231 | A1* | 6/2011 | Hulvey et al. | 348/56 |
| 2011/0234774 | A1* | 9/2011 | Satoh et al. | 348/56 |
| 2011/0285833 | A1* | 11/2011 | Tsurumoto et al. | 348/56 |

FOREIGN PATENT DOCUMENTS

| | | |
|---|---|---|
| JP | 06-223035 A | 8/1994 |
| JP | 2010-117437 A | 5/2010 |

* cited by examiner

*Primary Examiner* — Daquan Zhao
(74) *Attorney, Agent, or Firm* — Studebaker & Brackett PC

(57) ABSTRACT

A receiver allows controlling a device to be controlled such as a display device based on reference timing acquired from reception data without delay and with low power consumption, and includes: a communication device receiving data incoming intermittently; a first control circuit analyzing the data received by the communication device to identify the presence of a predetermined reference timing signal pattern in the data; and a timer for counting a clock from an initial value, generating a control signal for the device to be controlled according to a resulting count value, and if the count value reaches a predetermined interval value, resuming counting the clock at the initial value. The timer changes the initial value to reduce a count of the clock between the initial value and the interval value if the first control circuit identifies the predetermined reference timing signal pattern to be present.

13 Claims, 16 Drawing Sheets

RECEIVER, SHUTTER GLASSES, AND COMMUNICATION SYSTEM

BACKGROUND OF THE INVENTION

1. Field of the Invention

The present invention relates to a communication device which controls a device to be controlled based on reference timing that is acquired from reception data, shutter glasses which open and close shutters based on reference timing that is acquired from reception data, and a communication system which transmits and receives data that indicates reference timing.

2. Description of the Related Art

In a 3D video display system, a 3D-capable television apparatus and 3D glasses, or shutter glasses, communicate with each other so that the operation timing of the 3D-capable television apparatus will coincide with that of the 3D glasses. FIG. 1 schematically shows a conventional wireless communication system that is applicable to such a 3D video display system.

A transmitter 1 includes at least a control device 3 and a communication device 4. The control device 3 periodically generates data to be transmitted to a receiver 2, and generates a data transmission command for the communication device 4. The data to be transmitted includes data that indicates reference timing. The control device 3 also performs transmission and reception control on packets including data on the communication device 4. The communication device 4 transmits and receives packets through an antenna 4a according to commands from the control device 3.

The receiver 2 includes at least a communication device 5 and a display device 6. The communication device 5 receives transmission packets from the transmitter 1 through an antenna 5a. The communication device 5 extracts reception data from the packets and, if the data indicates reference timing, supplies a control signal synchronous with the detection of the reference timing to the display device 6. The display device 6 is a device that provides a display in synchronization with the reference timing transmitted from the transmitter 1. The display device 6 performs a display operation according to the control signal supplied from the communication device 5.

The operation of the transmitter 1 will be described. In the transmitter 1, a built-in timer (not shown) of the control device 3 measures predetermined cycles (interval period). When the measurement is completed, the control device 3 composes a transmission packet, issues a transmission command to the communication device 4, and transfers the transmission packet to the communication device 4. Receiving the transmission command and transmission packet from the control device 3, the communication device 4 modulates the transmission packet and sends out the resulting digital signal as an RF signal of a predetermined frequency.

Next, the operation of the receiver 2 will be described. In the receiver 2, a built-in timer of the communication device 5 measures predetermined cycles. When the measurement is completed, the communication device 5 receives the RF signal sent from the transmitter 1. The communication device 5 demodulates a reception signal corresponding to the RF signal into a digital signal, and extracts data in the packet from the digital signal.

The communication device 5 includes a control circuit that performs transmission and reception control of the communication device. When packet reception is completed, the control circuit analyzes the data in the packet and, if the data is determined to be destined to the own circuit, outputs a control signal for controlling the display device 6.

As shown in FIG. 2, in the transmitter 1, the aforementioned built-in timer of the control device 3 counts predetermined cycles (interval period). Each time the counting is completed, the transmitter 1 starts to transmit a packet that includes data notifying of the completion of the interval period. The receiver 2 receives the packet and, after a lapse of processing time of the foregoing control circuit, performs control on the display device 6 according to the data in the packet.

If such a wireless communication system is applied to a 3D video display system, the transmitter 1 is implemented on the 3D-capable television apparatus and the receiver 2 is implemented on the 3D glasses. The display device 6 corresponds to liquid crystal display devices of the 3D glasses (see Patent Literature 1). The transmitter 1 inserts a synchronization signal pattern that represents a synchronization signal into the packet as data to be transmitted. The control circuit discriminates the synchronization signal pattern by data analysis. When the result of data analysis shows that the packet data contains a synchronization signal pattern, the control circuit in the communication device 5 assumes the point in time to be the time of occurrence of a synchronization signal. As shown by full lines in FIG. 3, the control circuit generates a left shutter open/close signal and a right shutter open/close signal of the 3D glasses as respective control signals. The 3D glasses have liquid crystal shutters at positions where corresponding to right and left lenses of ordinary glasses. The right and left liquid crystal shutters can be individually opened and closed in response to the right shutter open/close signal and the left shutter open/close signal, respectively, which allows functioning as a pair of 3D glasses.

Patent Literature 1: Japanese Patent Kokai No. 2010-117437
Patent Literature 2: Japanese Patent Kokai No. H6-223035

SUMMARY OF THE INVENTION

In the conventional wireless communication system, the display device 6 is controlled with reference to the point in time when the control circuit in the communication device 5 completes analyzing data on a reception packet. The processing period (FIG. 2) needed for the control circuit to perform data analysis varies depending on noise contamination and other instabilities during reception and depending on data type. Such variations make it difficult to generate control signals including the shutter open/close signals in strict timing, and there has thus been a problem of delay. For example, in the case of the foregoing 3D glasses, a delay in the timing of the generation of the control signals can displace the opening and closing timing of the liquid crystal shutters as shown by the broken lines in FIG. 3. This causes troubles such as flickering on the 3D picture output from the television screen.

Patent Literature 2 proposes supplying a CPU with excessive power for the sake of CPU acceleration. The application of such a technique to the control circuit of the foregoing conventional wireless communication system, however, causes another problem of unnecessary power consumption. Portable devices such as 3D glasses are often powered by a battery, and a reduction in power consumption is desired.

The present invention has been achieved in view of the foregoing, and an object thereof is to provide a receiver that allows control of a device to be controlled such as a display device based on reference timing acquired from reception data without delay and with low power consumption, shutter glasses that allow opening and closing of shutters based on reference timing acquired from reception data without delay and with low power consumption, and a communication system that allows transmission and reception of data indicating reference timing without delay and with low power consumption.

A receiver according to the present invention includes: a communication device for receiving data incoming intermittently; a first control circuit for analyzing the data received by the communication device to identify whether or not a predetermined reference timing signal pattern is present in the data; and timer means for counting a clock from an initial value, generating a control signal for a device to be controlled according to a resulting count value, and if the count value reaches a predetermined interval value, resuming counting the clock at the initial value, the timer means changing the initial value to reduce a count of the clock between the initial value and the interval value if the first control circuit identifies the predetermined reference timing signal pattern to be present.

Shutter glasses according to the present invention are shutter glasses having a right eye shutter and a left eye shutter, the shutter glasses including: a communication device for receiving data incoming intermittently; a first control circuit for analyzing the data received by the communication device to identify whether or not a predetermined reference timing signal pattern is present in the data; and timer means for counting a clock from an initial value, generating control signals for opening and closing the respective right and left eye shutters according to a resulting count value, and if the count value reaches a predetermined interval value, resuming counting the clock at the initial value, the timer means changing the initial value to reduce a count of the clock between the initial value and the interval value if the first control circuit identifies the predetermined reference timing signal pattern to be present.

A communication system according to the present invention includes: a transmitter for intermittently transmitting data containing a predetermined reference timing signal pattern; and a receiver that includes a communication device for receiving the data, the receiver including a first control circuit for analyzing the data received by the communication device to identify whether or not the predetermined reference timing signal pattern is present in the data, and timer means for counting a clock from an initial value, and generating a control signal for a device to be controlled according to a resulting count value, and if the count value reaches a predetermined interval value, resuming counting the clock at the initial value, the timer means changing the initial value to reduce a count of the clock between the initial value and the interval value if the first control circuit identifies the predetermined reference timing signal pattern to be present.

According to the receiver of the present invention, if the first control circuit determines by data analysis that the data intermittently incoming contains a synchronization signal pattern, the timer means changes the initial value to reduce the clock count between the initial value and the interval value. The timing of the generation of the control signal according to the count value of the timer means can thus be set without as much delay as time taken for the data analysis. This enables accurate control of the device to be controlled such as a display device. Operations that have been processed in a conventional communication device can be performed by the first control circuit and the timer means outside the communication device for load distribution. Since a high-speed high-load CPU need not be used for a control circuit in the communication device, it is possible to reduce the power consumption of the receiver.

According to the shutter glasses of the present invention, if the first control circuit determines by data analysis that the data intermittently incoming contains a synchronization signal pattern, the timer means changes the initial value to reduce the clock count between the initial value and the interval value. The timing of the generation of the control signals for opening and closing the respective right and left eye shutters according to the count value of the timer means can thus be set without as much delay as time taken for the data analysis. This enables accurate control of the right eye shutter and the left eye shutter. Operations that have been processed in a conventional communication device can be performed by the first control circuit and the timer means outside the communication device for load distribution. Since a high-speed high-load CPU need not be used for a control circuit in the communication device, it is possible to reduce the power consumption of the receiver.

According to the communication system of the present invention, if the first control circuit of the receiver determines by data analysis that the data intermittently incoming from the transmitter contains a synchronization signal pattern, the timer means changes the initial value to reduce the clock count between the initial value and the interval value. The timing of the generation of the control signal according to the count value of the timer means can thus be set without as much delay as time taken for the data analysis. This enables accurate control of the device to be controlled such as a display device. Operations that have been processed in the communication device of a receiver in a conventional system can be performed by the first control circuit and the timer means outside the communication device for load distribution. Since a high-speed high-load CPU need not be used for a control circuit in the communication device, it is possible to reduce the power consumption of the receiver.

DETAILED DESCRIPTION OF THE INVENTION

Hereinafter, an embodiment of the present invention will be described in detail with reference to the drawings.

Figure 1:
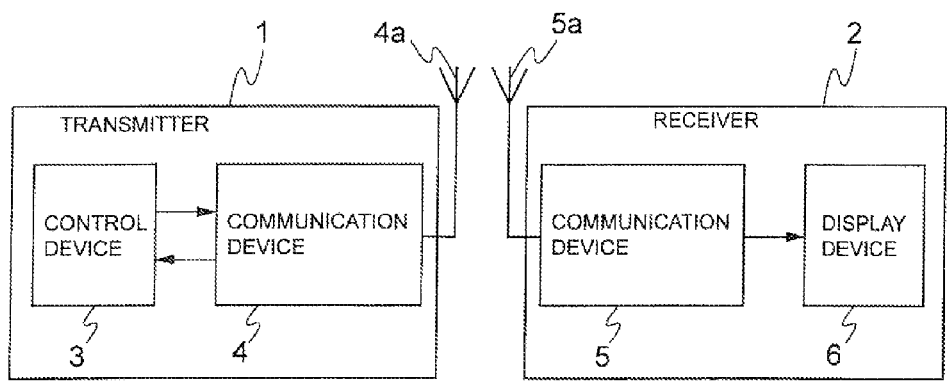
FIG. 1 is a block diagram showing the general configuration of a conventional wireless communication system.
Figure 2:
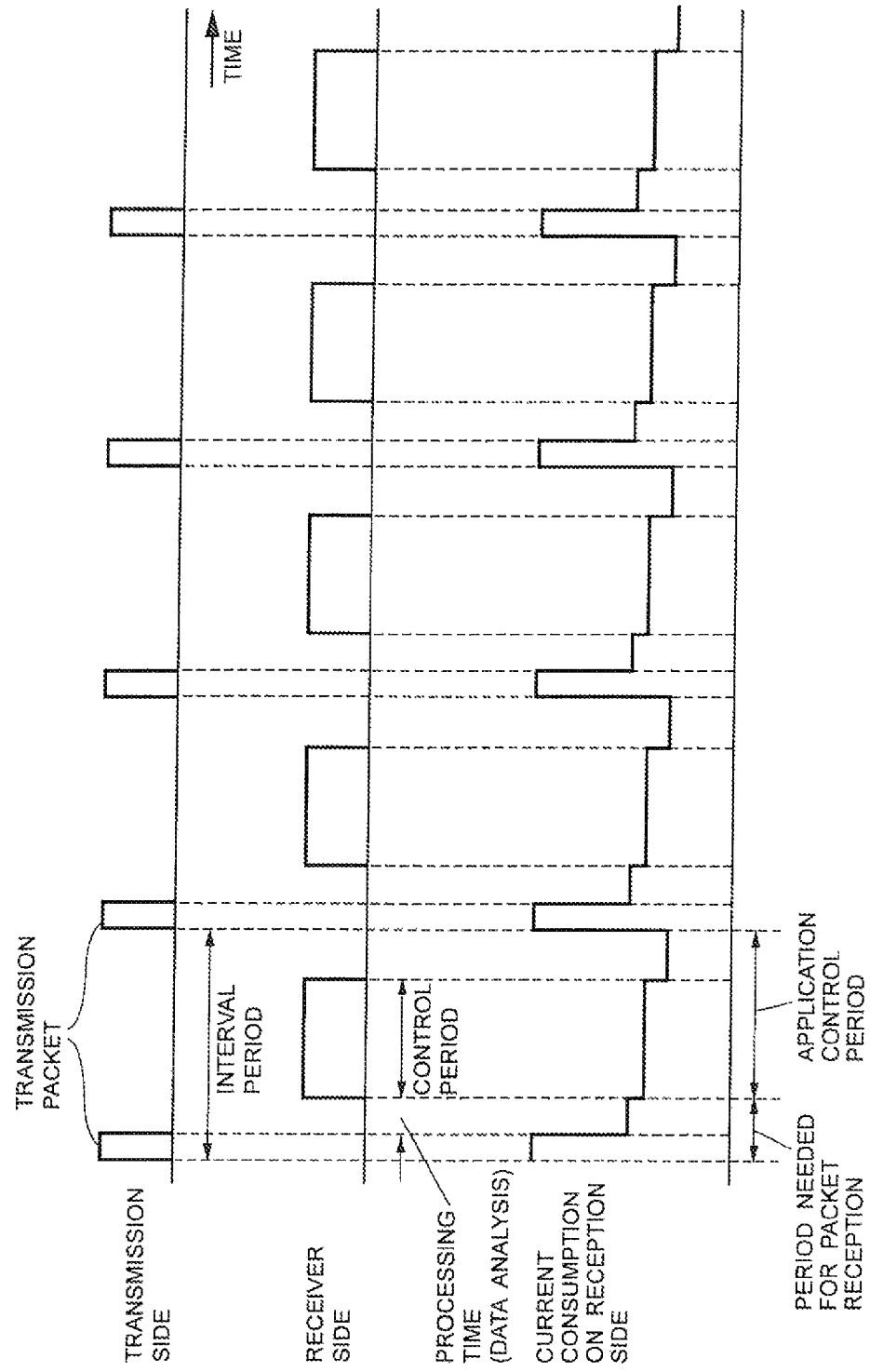
FIG. 2 is a chart showing a timing relationship between transmission packets on a transmission side and operation on a reception side.
Figure 3:
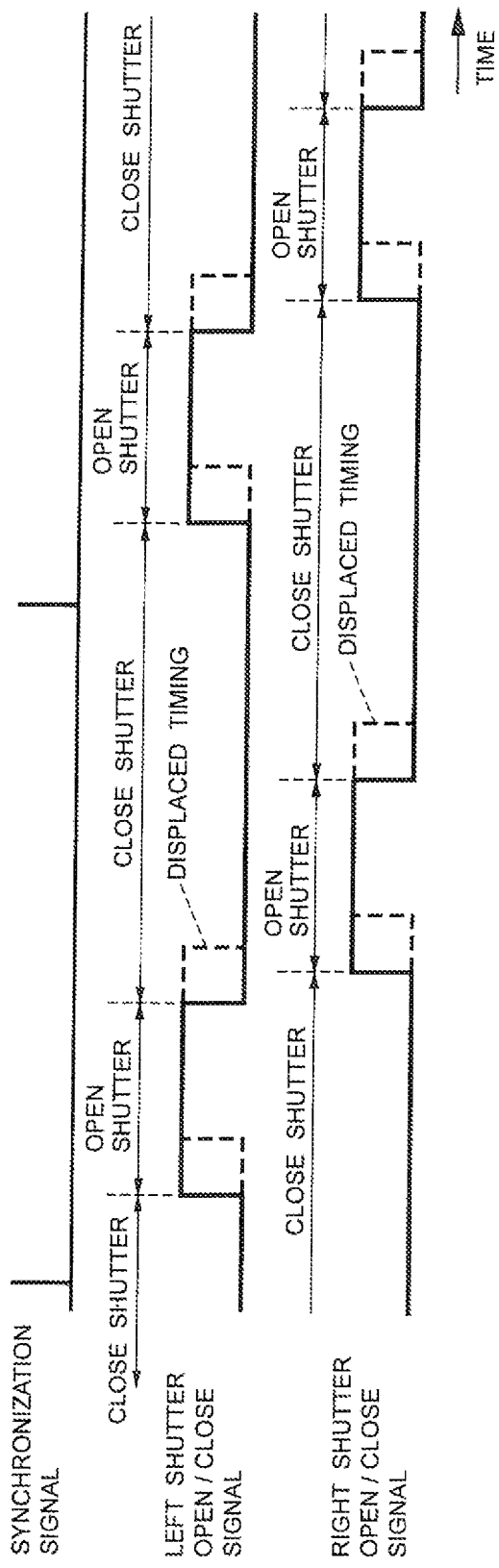
FIG. 3 is a chart showing the open and close timing of shutters in 3D glasses.
Figure 4:
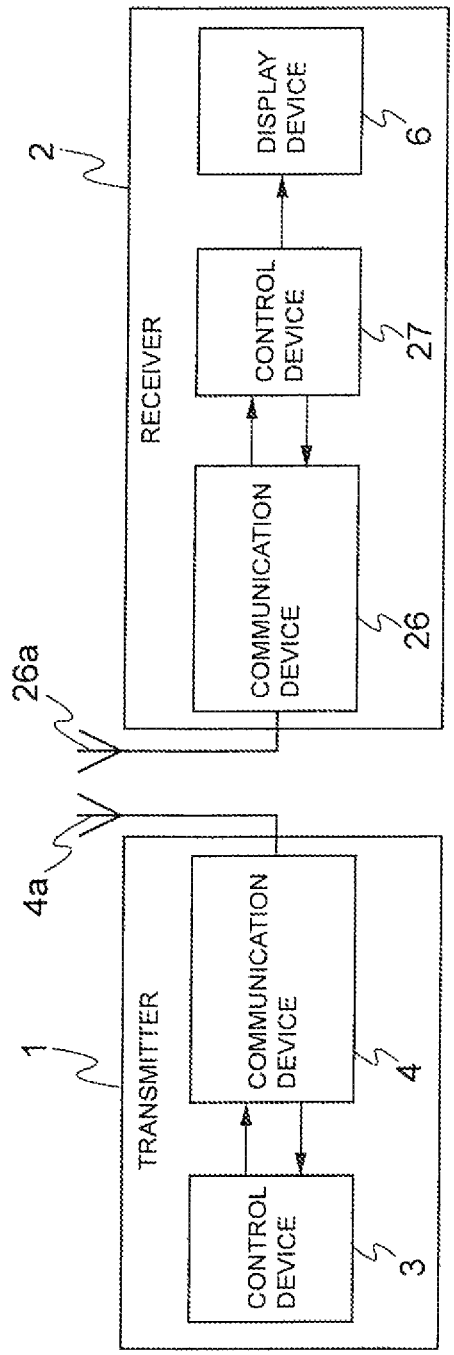
FIG. 4 is a block diagram showing the general configuration of a wireless communication system according to the present invention.

FIG. 4 shows a transmitter 1 and a receiver 2 that constitute a wireless communication system according to the present invention. As in a conventional wireless communication system, the transmitter 1 includes a control device 3 and a communication device 4. The receiver 2 includes a communication device 26, a control device 27, and a display device 6. The communication device 26 is connected to the display device 6 through the control device 27.

Figure 5:
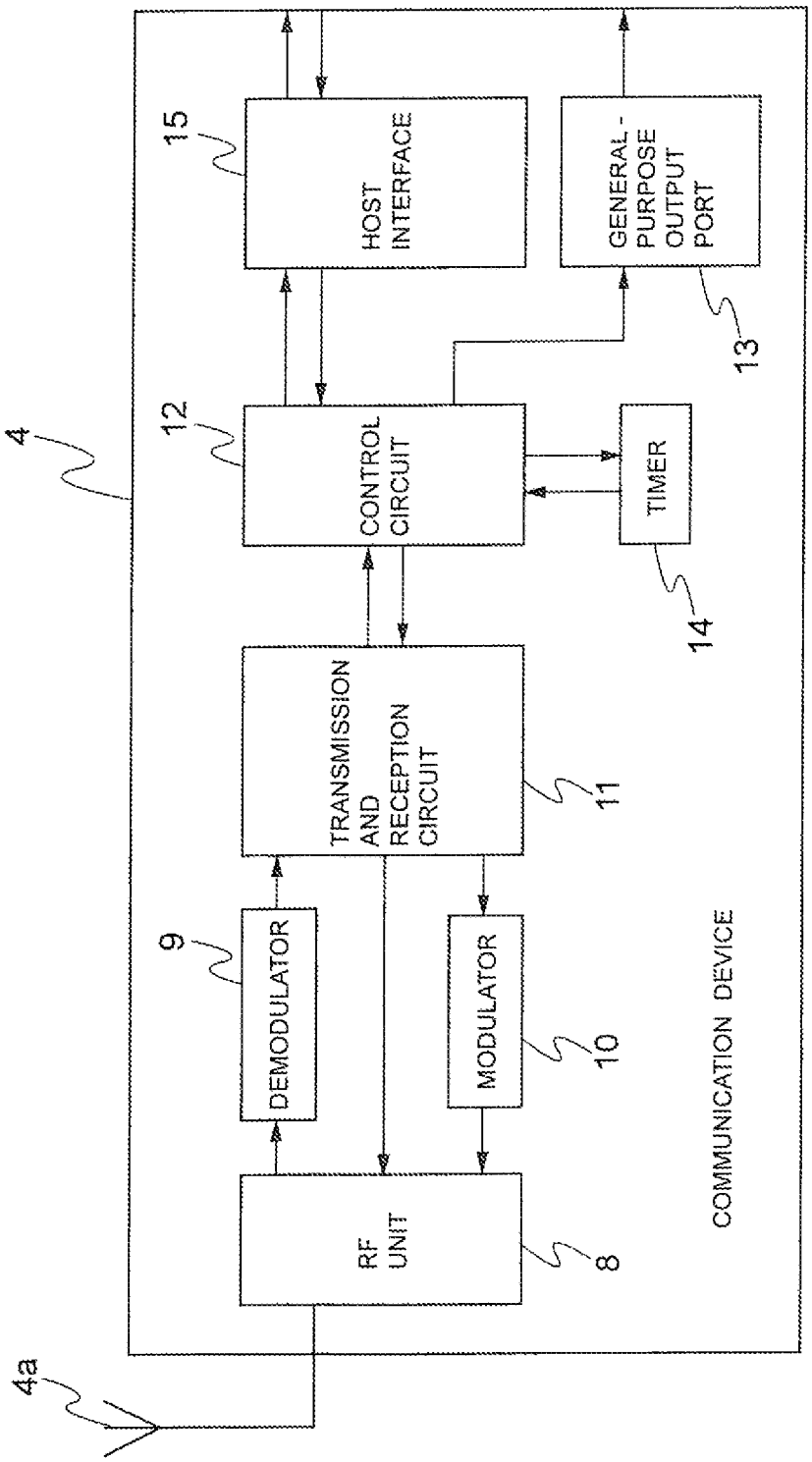
FIG. 5 is a block diagram showing the configuration of a communication device included in the transmitter in the system of FIG. 4.

As shown in FIG. 5, the communication device 4 in the transmitter 1 includes a radio frequency (RF) unit 8, a demodulator 9, a modulator 10, a transmission and reception circuit 11, a control circuit 12, a general-purpose output port 13, a timer 14, and a host interface 15.

The RF unit 8 switches to any one of a transmission state, a reception state, and a stop state according to commands (transmission command, reception command, and stop command) from the transmission and reception circuit 11. At the time of transmission, the RF unit 8 outputs a digital signal input from the modulator 10 as an RF signal (wireless signal) through an antenna 4a. At the time of reception, the RF unit 8 receives an RF signal input from the antenna 4a and outputs the RF signal to the demodulator 9 as a reception signal. The RF unit 8 also switches transmission and reception channels (frequencies) according to a channel switch command from the transmission and reception circuit 11.

The demodulator 9 demodulates the reception signal input from the RF unit 8 into a digital signal (including demodulation packets) and outputs the digital signal to the transmission and reception circuit 11. The modulator 10 modulates transmission packets input from the transmission and reception circuit 11 and outputs the modulated packets to the RF unit 8 for transmission.

The transmission and reception circuit 11, at the time of reception, identifies packets in the digital signal output from the demodulator 9 and extracts data in the packets according to a command from the control circuit 12. At the time of transmission, the transmission and reception circuit 11 generates transmission packets including data to be transmitted, supplied from the control circuit 12, and outputs the transmission packets to the modulation circuit 10 according to a command from the control circuit 12.

The control circuit 12 includes a CPU. The control circuit 12 generates various types of commands for transmission and reception operations, and controls the transmission and reception circuit 11, the general-purpose output port 13, the timer 14, and the host interface 15 in the communication device 4. The control circuit 12 also controls the RF unit 8 through the transmission and reception circuit 11.

The general-purpose output port 13 controls port output including a data supply to a device to be controlled (not shown) according to a command from the control circuit 12. In the present embodiment, no device to be controlled is connected to the general-purpose output port 13 of the communication device 4. This is not restrictive, and a device to be controlled such as a display device may be connected.

The timer 14 counts for a certain time according to a command from the control circuit 12. Upon expiration of the counting, the timer 14 notifies the result to the control circuit 12.

The host interface 15 is an interface circuit for data input and output between the control device 3 and the communication device 4.

Figure 6:
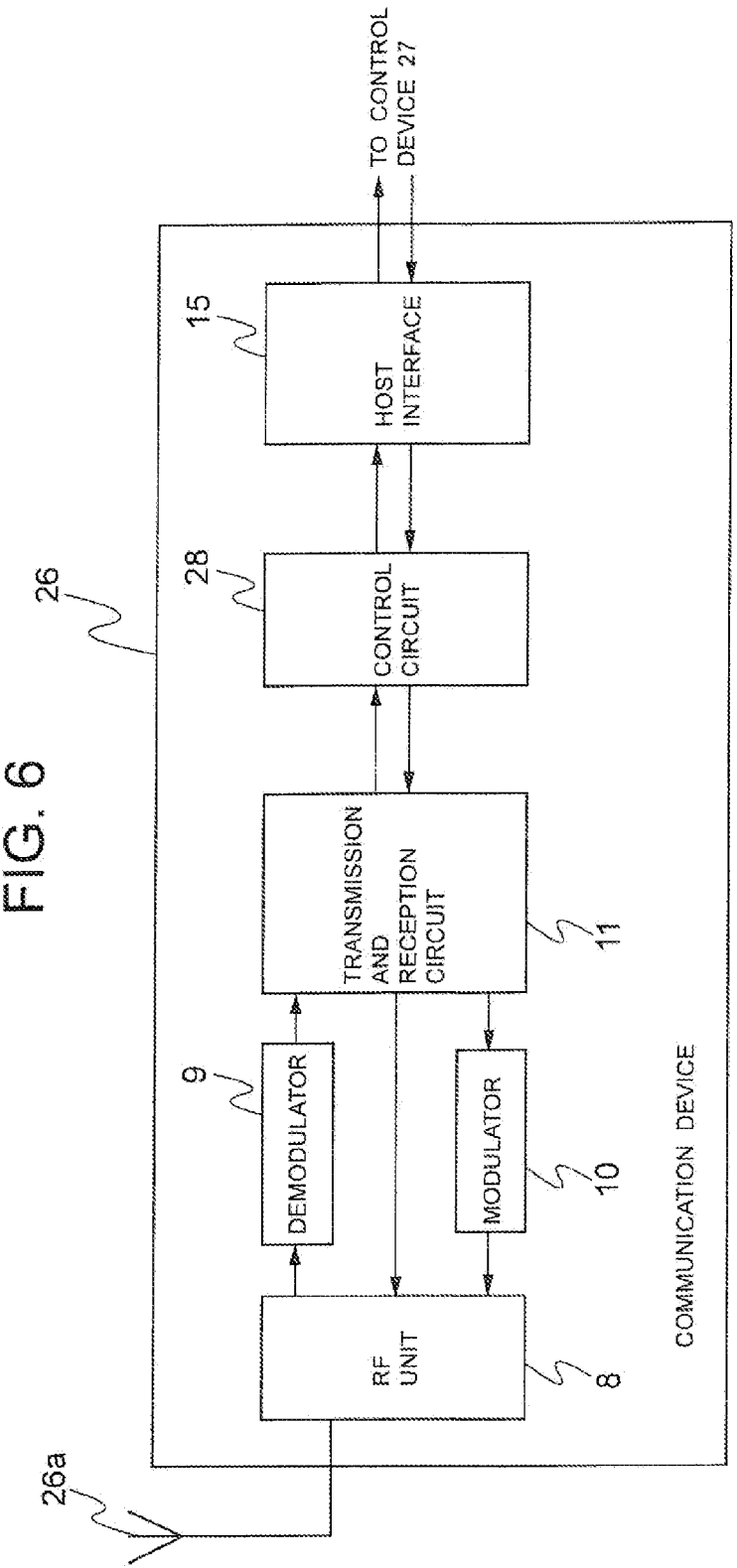
FIG. 6 is a block diagram showing the configuration of a communication device included in the receiver in the system of FIG. 4.

As shown in FIG. 6, the communication device 26 in the receiver 2 includes an RF unit 8, a demodulator 9, a modulator 10, a transmission and reception circuit 11, a control circuit 28 (second control circuit), and a host interface 15. The RF unit 8, the demodulator 9, the modulator 10, the transmission and reception circuit 11, and the host interface 15 may be the same as those of the communication device 4 shown in FIG. 5. A redundant description will be omitted except for the transmission and reception circuit 11. The transmission and reception circuit 11 has a relationship with the control circuit 28, and its internal configuration will be described in detail. The communication device 26 has neither of the general-purpose output port 13 and the timer 14 which are included in the communication device 4 shown in FIG. 5. The communication device 26 has an antenna which is designated by the reference numeral 26a.

The communication device 26 is formed as an integral semiconductor chip. A part of the communication device 26, such as the transmission and reception circuit 11 and the control circuit 28, may be formed as an integral semiconductor chip.

Figure 7:
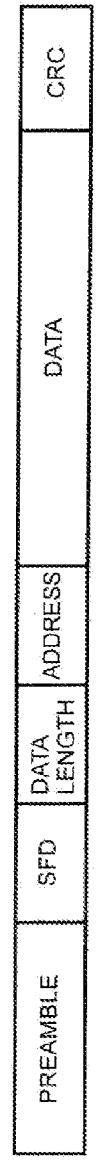
FIG. 7 is a diagram showing a packet structure.

The transmitter 1 and the receiver 2 transmit and receive packets in the form of an RF signal. As shown in FIG. 7, a packet is configured to include a preamble, a start frame delimiter (SFD), a data length, an address, data, and a cyclical redundancy check (CRC) in order from the start. The preamble is a signal pattern that makes the reception side recognize the start of a packet, thereby providing synchronization timing for packet reception. The SFD is an identification bit pattern which comes between the preamble and data. The data length indicates the length of effective data (address, data, and CRC sections) in the packet. The address is a destination address. A source address may also be included. The data is the body of data. As for data type, the data includes a synchronization signal pattern (reference timing signal pattern), a piece of data that indicates the foregoing reference timing. The CRC is a value for checking for errors during packet transmission.

Figure 8:
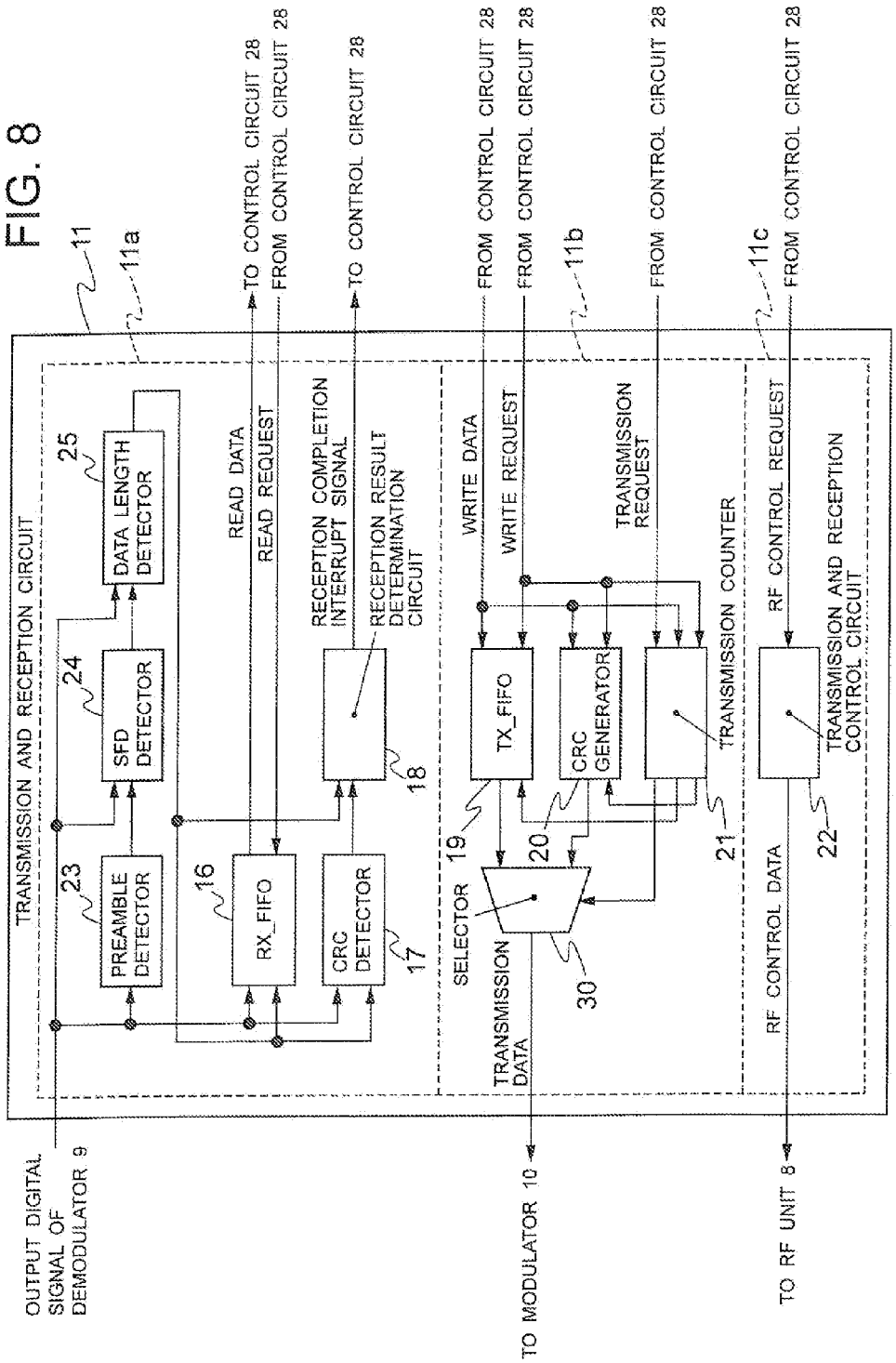
FIG. 8 is a block diagram showing the configuration of a transmission and reception circuit included in the communication device of FIG. 6.

As shown in FIG. 8, the transmission and reception circuit 11 in the communication device 26 includes a reception system circuit 11a, a transmission system circuit 11b, and an RF control system circuit 11c.

The reception system circuit 11a includes a preamble detector 23, an SFD detector 24, a data length detector 25, an RX_FIFO 16, a CRC detector 17, and a reception result determination circuit 18. The output of the demodulator 9 is connected to the preamble detector 23, the SFD detector 24, the data length detector 25, the RX_FIFO 16, and the CRC detector 17. The output of the preamble detector 23 is connected to the SFD detector 24. The output of the SFD detector 24 is connected to the data length detector 25. The output of the data length detector 25 is connected to the RX_FIFO 16, the CRC detector 17, and the reception result determination circuit 18.

The preamble detector 23 identifies a preamble pattern in the output digital signal of the demodulator 9. If a preamble is detected, the preamble detector 23 notifies the SFD detector 24 of the detection of the preamble.

Receiving the notification of the detection of the preamble from the preamble detector 23, the SFD detector 24 identifies an SFD pattern in the digital signal output from the demodulator 9. When the SFD detector 24 completes detecting the SFD pattern, the SFD detector 24 notifies the data length detector 25 of the detection of the SFD. The completion of the detection of the SFD pattern means that the preamble and SFD sections of the packet end and an effective data area follows.

The data length detector 25 is a detector that detects the range of an effective data area (effective data length) in a received packet. Receiving the notification of the detection of the SFD from the SFD detector 24, the data length detector 25 detects the subsequent piece of data from the output digital signal of the demodulator 9 as a reception data length. Based on the detection, the data length detector 25 notifies the RX_FIFO 16 and the CRC detector 17 of the start of data reception. After the detection of the data length, the data length detector 25 counts up on each reception of one byte. When data is received as much as the data length, the data length detector 25 notifies the RX_FIFO 16 and the CRC detector 17 of the stop of data reception. The data length detector 25 further notifies the reception result determination circuit 18 of the completion of data reception. As employed herein, the data length is a parameter that indicates the data length of the packet having the structure shown in FIG. 7 excluding the preamble and the SFD (i.e., the address, data, and CRC sections) as described above.

The RX_FIFO 16 is a data retaining unit for storing reception data on the effective data part. When the RX_FIFO 16 receives the notification of the start of data reception which is input from the data length detector 25, the RX_FIFO 16 takes in the output digital signal of the demodulator 9 and starts a data storing operation. When the RX_FIFO 16 receives the notification of the completion of data reception, the RX_FIFO 16 stops the data storing operation. When the RX_FIFO 16 receives a data read command from the control circuit 28, the RX_FIFO 16 sends out the pieces of reception data in succession.

The CRC detector 17 calculates a CRC value of the data input to the RX_FIFO 16 in order to check the reception data. The CRC detector 17 notifies the CRC calculation to the reception result determination circuit 18.

The reception result determination circuit 18 is supplied with the notification of the completion of data reception from the data length detector 25 and the CRC calculation from the CRC detector 17. Receiving the notification of the completion of data reception, the reception result determination circuit 18 determines whether the CRC calculation is correct or wrong. If correct, the reception result determination circuit 18 immediately outputs a reception completion interrupt signal, which indicates the completion of reception of a packet, to the control circuit 28.

The transmission system circuit 11b includes a TX_FIFO 19, a CRC generator 20, a transmission counter 21, and a selector 30.

The TX_FIFO 19 stores transmission data (packet of FIG. 7 excluding the CRC section) which is input through the control circuit 28. The TX_FIFO 19 successively sends the pieces of stored data to the selector 30 in synchronization with an output command which is input from the transmission counter 21.

The CRC generator 20 performs a CRC operation on the data stored in the TX_FIFO 19 excluding the preamble and SFD to obtain a CRC value as a result of operation. The CRC generator 20 performs a CRC operation in response to a CRC operation command from the transmission counter 21, and then sends the operation result to the selector 30.

When a data length is set by the control circuit 28, the transmission counter 21 calculates a preamble area, an SFD area, a length area, a data area, and a CRC area from the timing of issuance of a packet transmission command. The transmission counter 21 issues a data transmission command, the CRC operation command, and a select command to the TX_FIFO 19, the CRC generator 20, and the selector 30 as timing signals upon each packet transmission.

The selector 30 selectively outputs the data sent from the TX_FIFO 19 and the CRC value of the CRC generator 20 to the modulator 10 according to the select command from the transmission counter 21.

The control system circuit 11c includes a transmission and reception control circuit 22. At the time of transmission and reception, the transmission and reception control circuit 22 receives an RF control command input from the control circuit 28, and outputs RF control data (the transmission command, reception command, stop command, and channel switch command of the transmission and reception circuit 11 described above) to the RF unit 8.

The control circuit 28 controls the RF unit 8, the transmission and reception circuit 11, and the host interface 15 in the communication device 26 described above. The control circuit 28 has the function of setting a low power consumption mode when transmission and reception are not needed.

Figure 9:
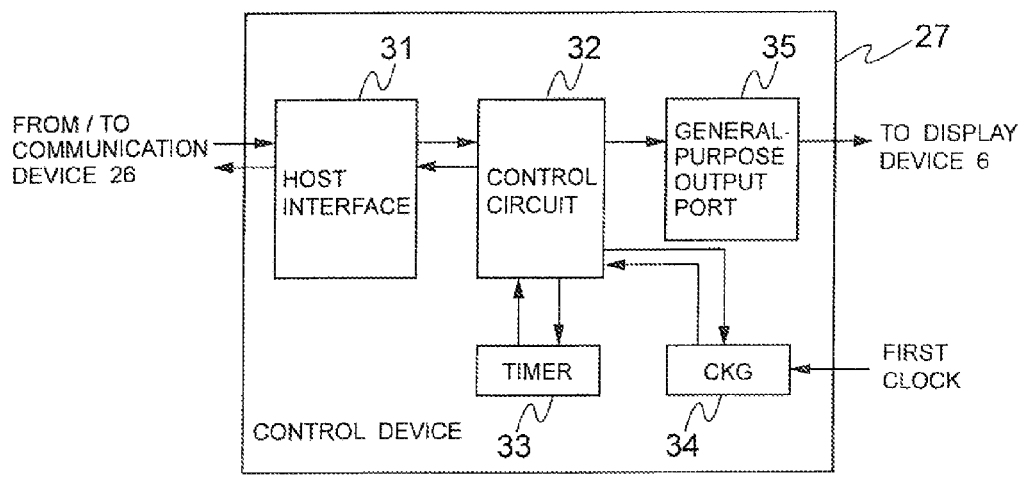
FIG. 9 is a block diagram showing the configuration of a control device included in the receiver in the system of FIG. 4.

As shown in FIG. 9, the control device 27 includes a host interface 31, a control circuit 32, a timer 33, a CKG (multiplication circuit) 34, and a general-purpose output port 35. The host interface 31 is an interface for connection to the communication device 26 so as to be capable of transmission and reception. The control circuit 32 is connected to the host interface 31, the timer 33, the CKG 34, and the general-purpose output port 35. The control circuit 32 inputs data obtained by the packet reception of the communication device 26 from the RX_FIFO 19 of the communication device 26 through the host interface 31. The control circuit 32 analyzes the data, and then outputs predetermined control data (control signals) to the general-purpose output port 35. The control circuit 32 makes the timer 33 measure predetermined cycles. Each time the timer 33 expires, the control circuit 32 performs a suspension/operation control on the communication device 26 through the host interface 31. The control circuit 32 switches the mode setting of the low power consumption mode on the CKG 34 in order to reduce power consumption in periods other than during reception data analysis and while controlling the communication device 26.

Figure 10:
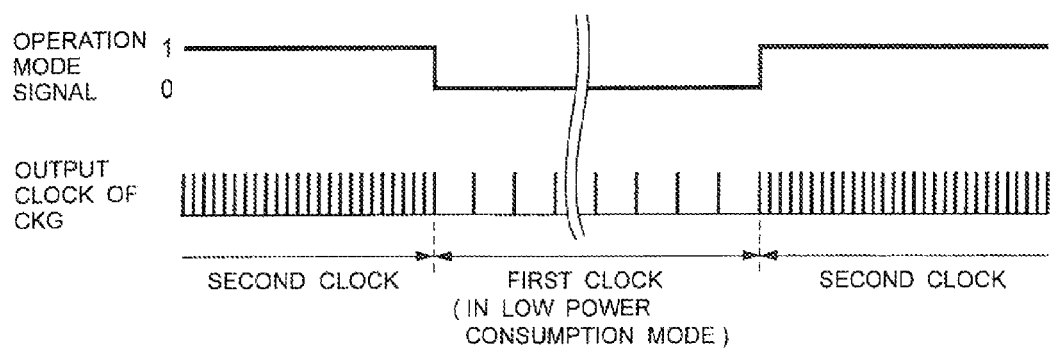
FIG. 10 is a diagram showing the relationship between an operation mode of a CKG circuit included in the control device of FIG. 9 and an output clock rate.

The CKG 34 inputs a first clock from outside and multiplies the frequency by n (integer) times to generate a second clock having a frequency higher than that of the first clock. The CKG 34 outputs either one of the first clock and the second clock to the control circuit 32 depending on an operation mode signal supplied from the control circuit 32. Specifically, as shown in FIG. 10, the CKG 34 outputs the first clock to the control circuit 32 when the operation mode signal has logic 0 which represents the low power consumption mode. When the operation mode signal has logic 1 which represents a release of the low power consumption mode, the CKG 34 multiplies the first clock to generate the second clock and supplies the second clock to the control circuit 32. Consequently, the control circuit 32 operates according to the timing of the first clock when in the low power consumption mode. The control circuit 32 operates according to the timing of the second clock when the low power consumption mode is released.

Next, the operation of the wireless communication system of FIG. 4 having such a configuration will be described with reference to FIG. 11.

Figure 11:
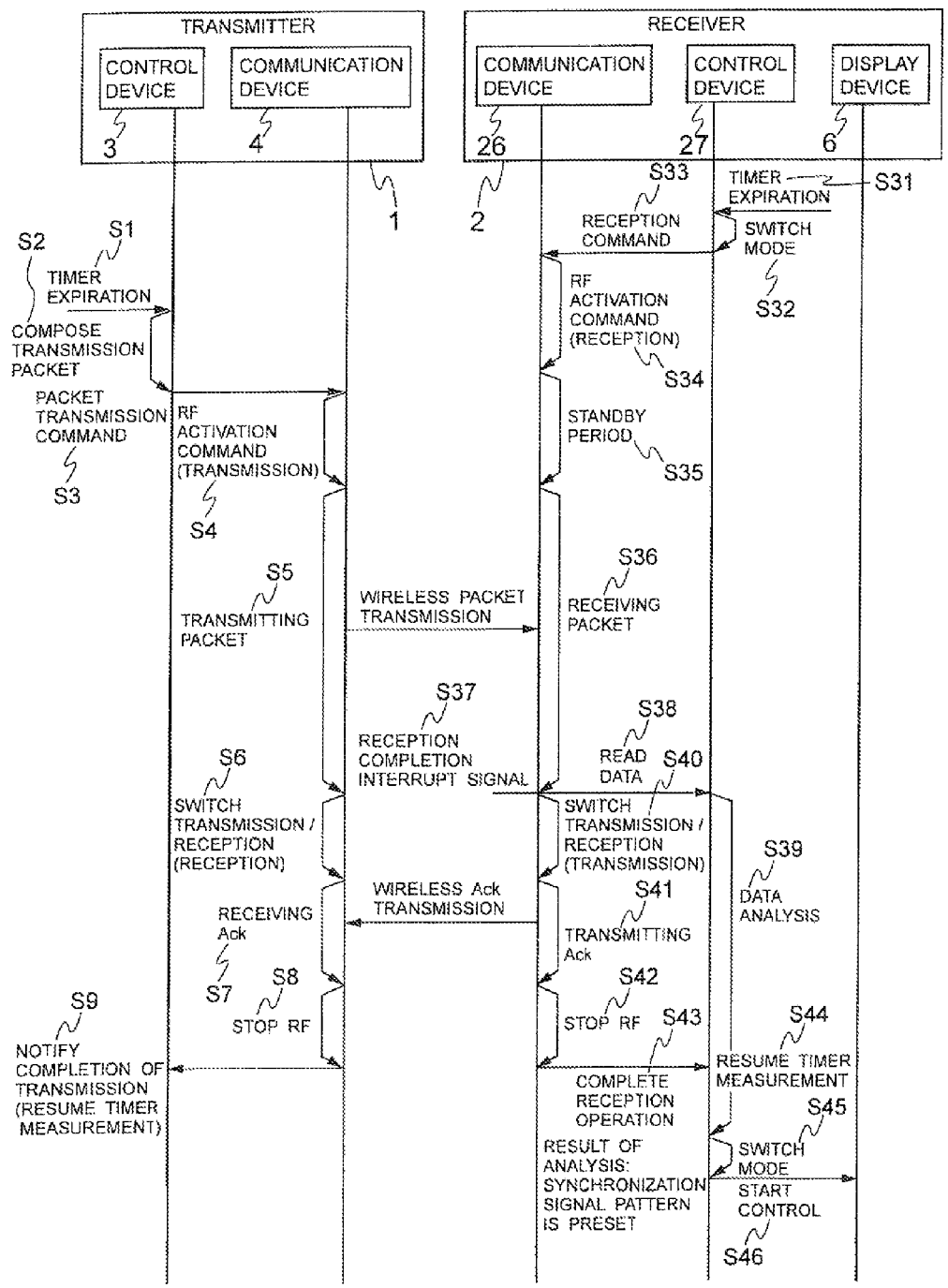
FIG. 11 is a sequence diagram showing the operation of the system of FIG. 4.

As shown in FIG. 11, in the transmitter 1, a built-in timer (not shown) of the control device 3 measures predetermined cycles (interval period). When the measurement is completed (S1), the control device 3 composes a transmission packet without a CRC (S2), issues a transmission command to the communication device 4 (S3), and transfers the transmission packet to the communication device 4. In the communication device 4, the control circuit 12 receives the transmission command and the transmission packet from the control device 3 through the host interface 15. The control circuit 12 issues an RF activation command to the transmission and reception circuit 11 (S4). The transmission and reception circuit 11 activates the RF unit 8 in a transmission state, adds a CRC to the input transmission packet, and outputs the resulting transmission packet to the modulator 10. The modulator 10 modulates the transmission packet, performs RF conversion on the digital signal, and supplies the resulting RF signal to the RF unit 8. The RF unit 8 sends out the RF signal at a predetermine frequency (S5).

Completing the transmission of the RF signal, the communication device 4 switches the RF unit 8 to a reception state (S6), and waits for the transmission of an Ack response packet (response packet as to the completion of reception of a packet) from the receiver 2 (S7). When the Ack reception is completed, the communication device 4 stops the RF unit 8 (S8), and notifies the control device 3 of the completion of transmission (S9).

Next, the operation of the receiver 2 will be described. The timer 33 built in the control device 27 of the receiver 2 measures predetermined cycles (interval period). When the measurement is completed (S31), the control circuit 32 performs mode switching to release the lower power consumption mode (S32), and issues a reception command to the communication device 26 (S33). The reception command is supplied from the control circuit 32 to the control circuit 28 of the communication device 26 through the host interfaces 31 and 15.

As described above, the control circuit 32 operates according to the timing of the first clock from the CKG 34 when in the low power consumption mode. When the low power consumption mode is released, the control circuit 32 operates according to the timing of the second clock which is generated by the multiplication operation of the CKG 34.

In the communication device 26, the control circuit 28 receives the reception command from the control device 27, and immediately issues a reception command to the transmission and reception circuit 11. As a result, the transmission and reception circuit 11 activates the RF unit 8 in a reception state (S34) and enters a standby state (S35) until actual reception of a packet. While receiving the packet transmitted from the transmitter 1 (S36), the demodulator 9 demodulates the analog signal corresponding to the RF signal received by the RF unit 8, and supplies the resulting digital signal to the transmission and reception circuit 11.

In the transmission and reception circuit 11, the preamble detector 23 initially detects a preamble in the packet from the output digital signal of the demodulator 9. The preamble detector 23 supplies the notification of the detection of the preamble to the SFD detector 24. In response to the notification of the detection of the preamble, the SFD detector 24 starts to identify an SFD pattern in the output digital signal of the demodulator 9. Completing the detection of the SFD pattern, the SFD detector 24 supplies the notification of the detection of the SFD to the data length detector 25. In response to the notification of the detection of the SFD, the data length detector 25 detects an effective data length in the packet from the output digital signal of the demodulator 9. The data length detector 25 notifies the RX_FIFO 16 and the CRC detector 17 of the start of data reception. In response to the notification of the start of data reception, the RX_FIFO 16 starts taking in data from the output digital signal of the demodulator 9, and stores the data as data on the effective data section. When data is received as much as the effective data length, the data length detector 25 notifies the RX_FIFO 16 and the CRC detector 17 of the stop of data reception. The data length detector 25 further notifies the reception result determination circuit 18 of the completion of data reception. In response to the notification of the stop of data reception, the RX_FIFO 16 stops taking data in, and completes storing the data on the effective data section.

When the reception result determination circuit 18 acquires the CRC calculation from the CRC detector 17 along with the notification of the completion of data reception, the reception result determination circuit 18 outputs the reception completion interrupt signal, which indicates the completion of the reception of the packet, to the control circuit 28 (S37). In response to the reception completion interrupt signal, the control circuit 28 reads the data stored in the RX_FIFO 16 and sends the read data to the control device 27 (S38). The read data is supplied from the control circuit 28 to the control circuit 32 of the communication device 27 through the host interfaces 15 and 31. The control circuit 32 starts to analyze the read data (including an address) (S39).

In response to the reception completion interrupt signal, the control circuit 28 issues a transmission command to the transmission and reception circuit 11 to switch the RF unit 8 to a transmission state (S40), and makes the RF unit 8 transmit an Ack response packet (S41). After the transmission of the Ack response packet, the control circuit 28 issues a stop command to the transmission and reception circuit 11 to switch the RF unit 8 to a stop state (S42). The control circuit 28 sends a notification of the completion of a reception operation to the control device 27 (S43). The notification of the completion of the reception operation is supplied from the control circuit 28 to the control circuit 32 of the control device 27 through the host interfaces 15 and 31.

In response to the notification of the completion of the reception operation, the control circuit 32 makes the timer 33 measure predetermined cycles (interval period) again (S44).

If the control circuit 32 determines by the data analysis of S39 that the data contains a synchronization signal pattern, the control circuit 32 performs mode switching to enter the low power consumption mode (S45). The control circuit 32 then starts to control the display device 6 (S46). The control circuit 32 enters the low power consumption mode immediately after the end of the processing operation for data analysis ends. The control circuit 32 therefore makes the control operation according to the first clock, thereby generating control signals and outputting the control signals to the display device 6 through the general-purpose output port 35. Simultaneously with the start of control on the display device 6, an internal counter (not shown) of the control circuit 32 starts counting the first clock at an initial value. When the count value reaches a lower limit value of control, the control circuit 32 generates a control signal and supplies it to the display device 6. When the count value increases further to reach an upper limit value, the control circuit 32 stops generating the control signal.

Figure 12:
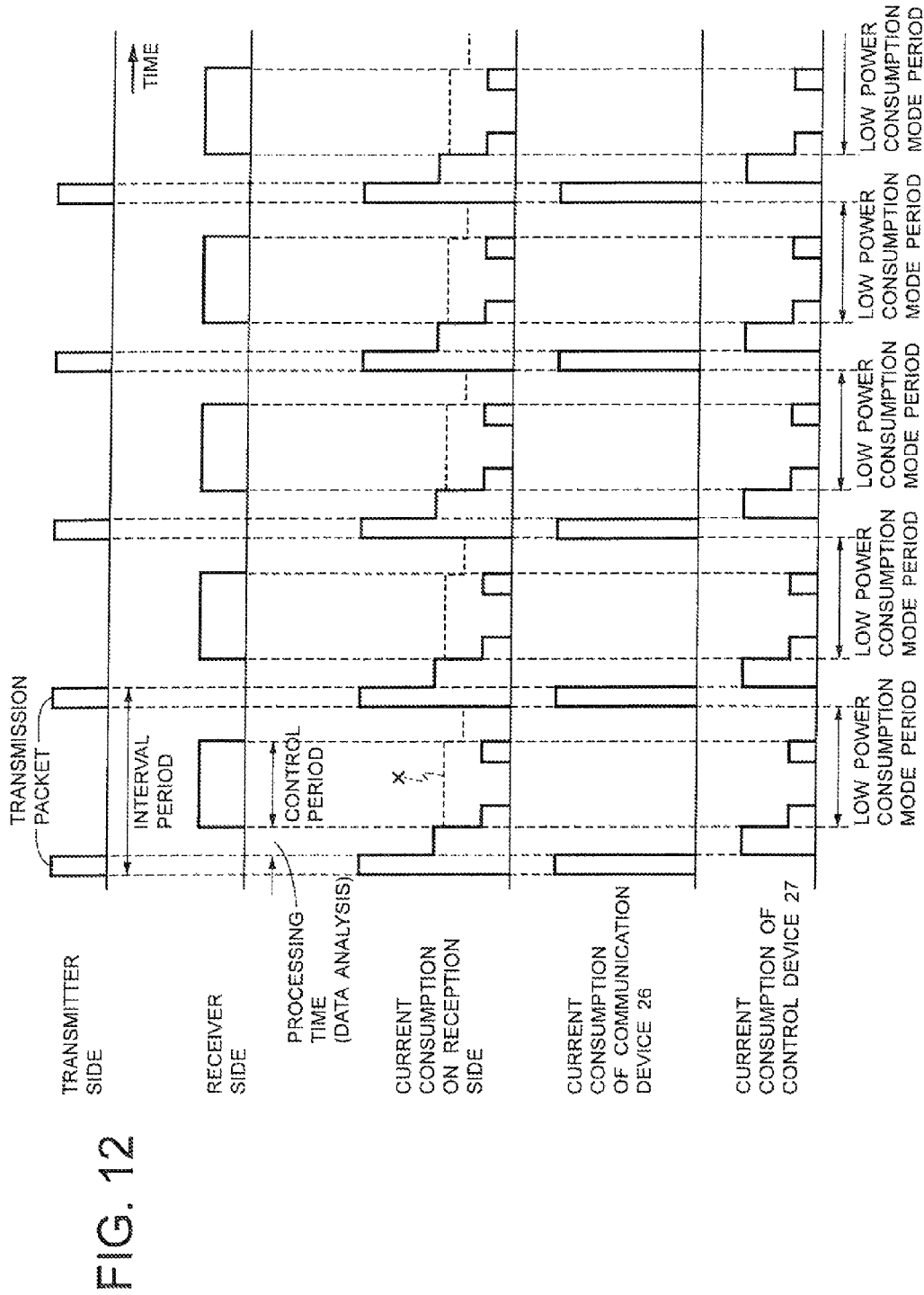
FIG. 12 is a chart showing a timing relationship between transmission packets on the transmission side and operation on the reception side, and current consumption on the reception side.

FIG. 12 shows the relationship between the timing of transmission of a synchronization signal on the side of the transmitter 1 and a control period on the side of the receiver 2 in the wireless communication system of FIG. 4, and changes in the amount of current consumption in the receiver 2. In a reception period where the receiver 2 receives a packet transmitted from the transmitter 1, the communication device 26 consumes current. In the subsequent processing period where the receiver 2 performs internal processing including data analysis inside the received packet, the control device 27 consumes current. In the reception period and the processing period, the low power consumption mode is released. The control circuit 28 in the communication device 26 thus operates according to the second clock. The control circuit 32 in the control device 27 also operates according to the second clock. At the end of the processing period, the control device 27 enters the low power consumption mode. The control circuit 32 of the control device 27 therefore performs a control operation (including the count operation of S46) on the display device 6 in synchronization with the first clock which has a frequency lower than that of the second clock. This significantly reduces the amount of current consumption.

As can be seen from FIG. 12, according to the wireless communication system of FIG. 4, the control device 27 operates in the low power consumption mode in a period between the end of a processing period and the start of the reception of a next packet, including a control period. This can significantly reduce the current consumption of the receiver 2 as compared to the conventional current consumption (broken line X in FIG. 12), thereby allowing a reduction in the power consumption of the receiver 2.

Figure 13:
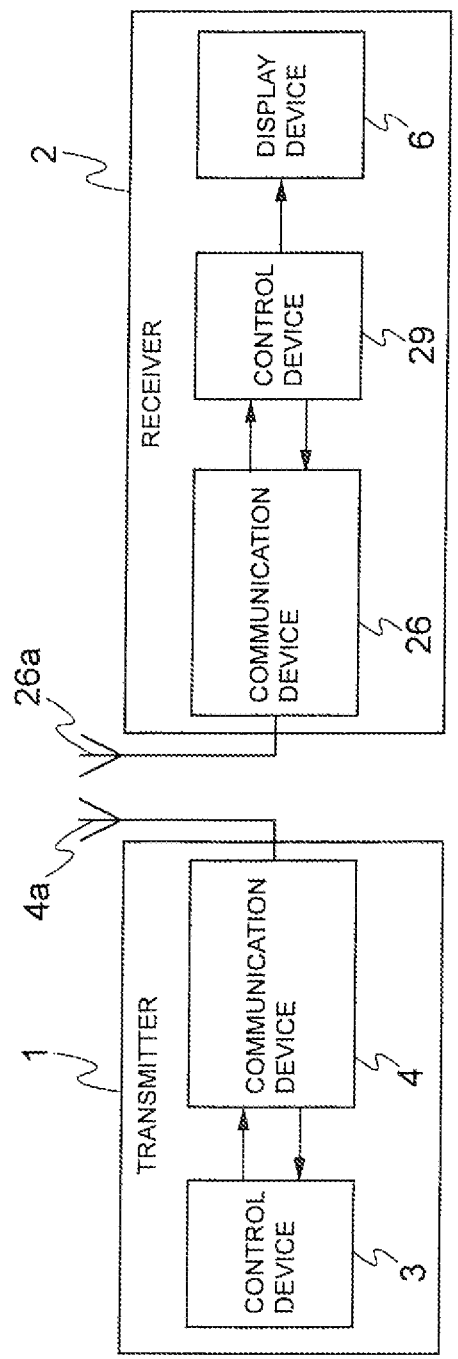
FIG. 13 is a block diagram showing the general configuration of a wireless communication system as an embodiment of the present invention.

FIG. 13 shows a transmitter 1 and a receiver 2 that constitute a wireless communication system as an embodiment of the present invention. As in the system of FIG. 4, the transmitter 1 includes a control device 3 and a communication device 4. The receiver 2 includes a communication device 26, a control device 29, and a display device 6. The communication device 26 and the display device 6 have the same configuration as in the system of FIG. 4.

Figure 14:
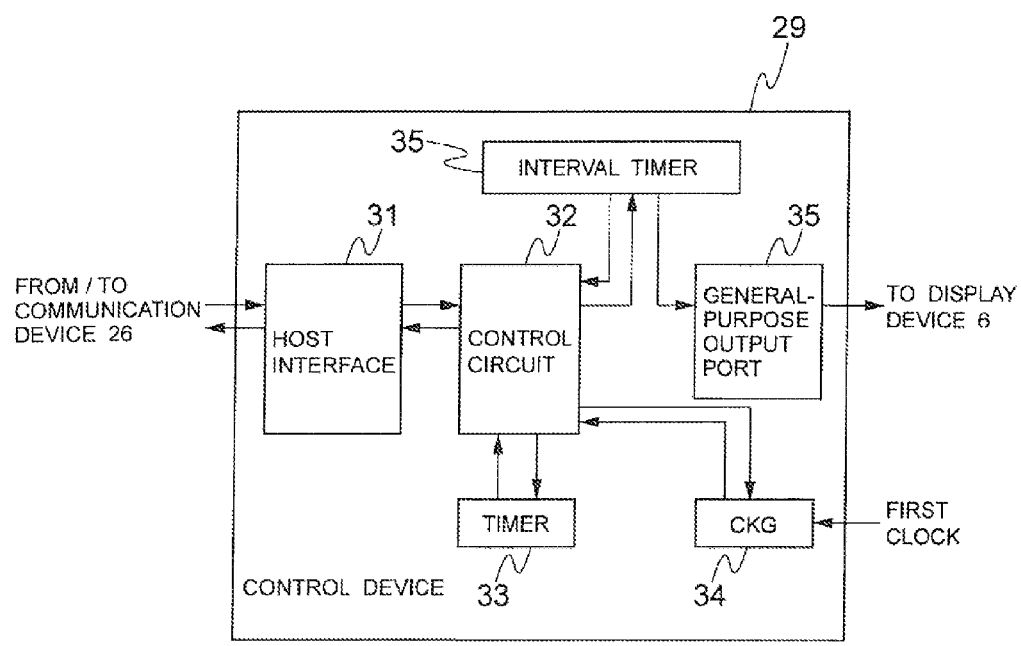
FIG. 14 is a block diagram showing the configuration of the control device included in the receiver in the system of FIG. 13.

As shown in FIG. 14, the control device 29 includes an interval timer 36 aside from a host interface 31, a control circuit (first control circuit) 32, a timer 33, a CKG 34, and a general-purpose output port 35. The host interface 31, the control circuit 32, the timer 33, the CKG 34, and the general-purpose output port 35 are the same as those included in the control device 27 shown in FIG. 9. Connections between such components are also the same.

Figure 15:
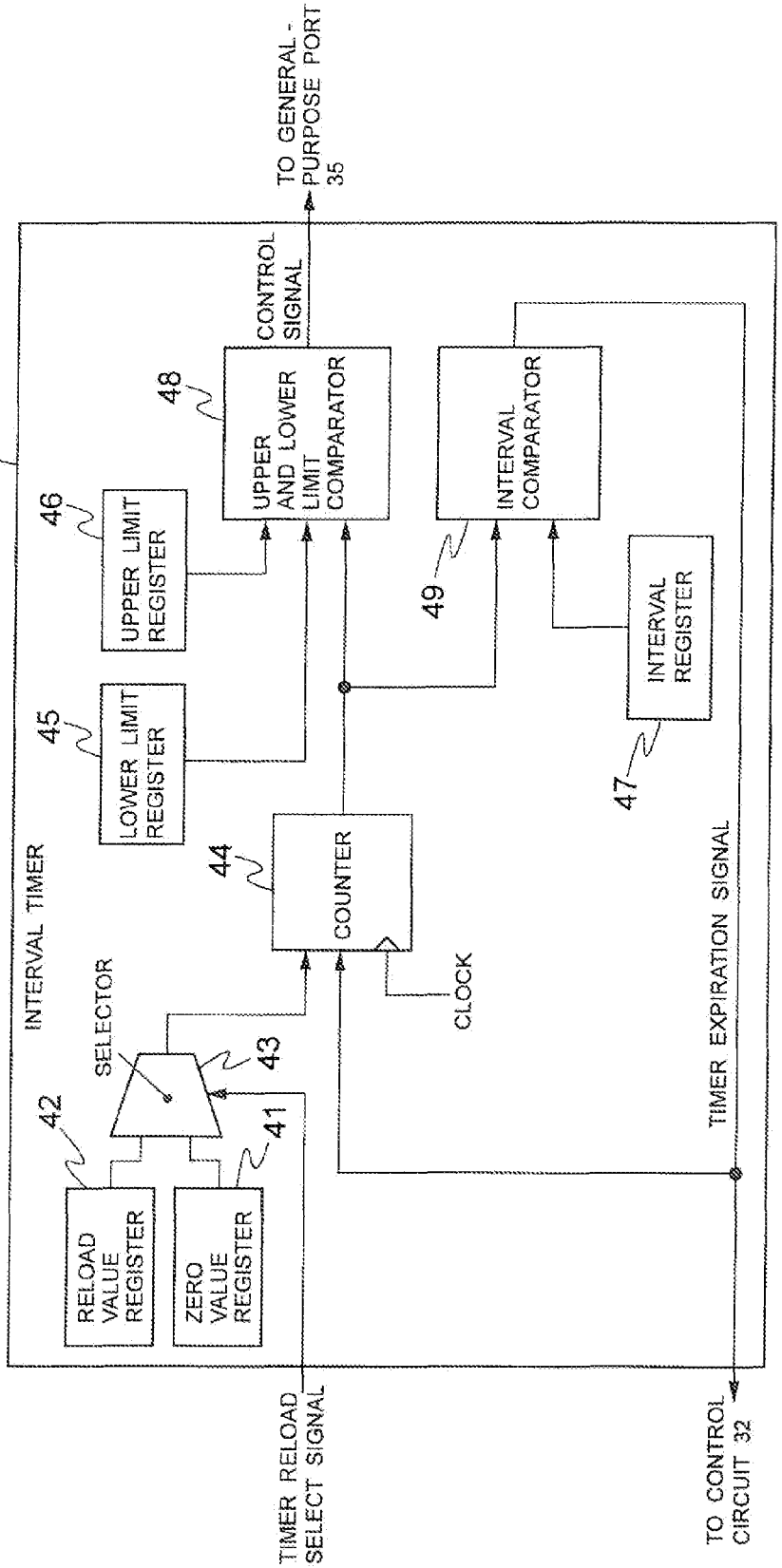
FIG. 15 is a block diagram showing the configuration of an interval timer included in the communication device of FIG. 14.

The interval timer 36 is timer means having the function of generating a control signal for the display device 6. As shown in FIG. 15, the interval timer 36 includes a zero value register 41, a reload value register 43, a selector 43, a counter 44, a lower limit register 45, an upper limit register 46, an interval register 47, an upper and lower limit comparator 48, and an interval comparator 49.

The zero value register 41 is a first register, which retains a zero value of 0 (first reference value). The reload value register 42 is a second register, which retains a reload value (second reference value). The reload value is greater than the zero value. The reload value is a clock count value equivalent to processing time that the control circuit 32 needs for data analysis. The retained outputs of the zero value register 41 and the reload value register 42 are connected to the selector 43. The selector 43 selects either one of the zero value and the reload value depending on a timer reload select signal supplied from the control circuit 32, and outputs the selected value to the counter 44. Specifically, if the timer reload select signal has a low level (corresponding to logic 0), the selector 43 selects the zero value as the initial value of the counter 44. If the timer reload select signal has a high level (corresponding to logic 1), the selector 43 selects the reload value as the initial value of the counter 44.

When a timer expiration signal to be described later is supplied to the counter 44, the counter 44 starts counting clocks (clock pulses) at the output value of the selector 43 and outputs the count value. The count output of the counter 44 is connected to the upper and lower limit comparator 48 and the interval comparator 49.

The upper and lower limit comparator 48 is connected with the lower limit register 45 and the upper limit register 46. The lower limit register 45 retains a lower limit value which is a count value corresponding to the start time of a period for generating a control signal. The lower limit value is greater than the reload value. The upper limit register 46 retains an upper limit value which is a count value corresponding to the end time of the period for generating a control signal. If the count value of the counter 44 reaches or exceeds the lower limit value of the lower limit register 45, the upper and lower limit comparator 48 generates a control signal of high level. If the count value of the counter 44 reaches the upper limit value of the upper limit register 46, the upper and lower limit comparator 48 stops generating the control signal of high level and outputs a low level. The output signal of the upper and lower limit comparator 48 is supplied to the display device 6 through the general-purpose output port 35.

The interval comparator 49 is connected with the interval register 47. The interval register 47 retains an interval value which is a count value corresponding to the repeat cycle of the control signal. When the count value of the counter 44 reaches the interval value of the interval register 47, the interval comparator 49 generates a timer expiration signal of high level. The timer expiration signal is supplied to the counter 44 and the control circuit 32.

In other respects, the configuration of the wireless communication system according to the present embodiment is the same as that of the wireless communication system shown in FIGS. 5, 6, and 8. Components designated by like reference numerals have the same functions.

Figure 16:
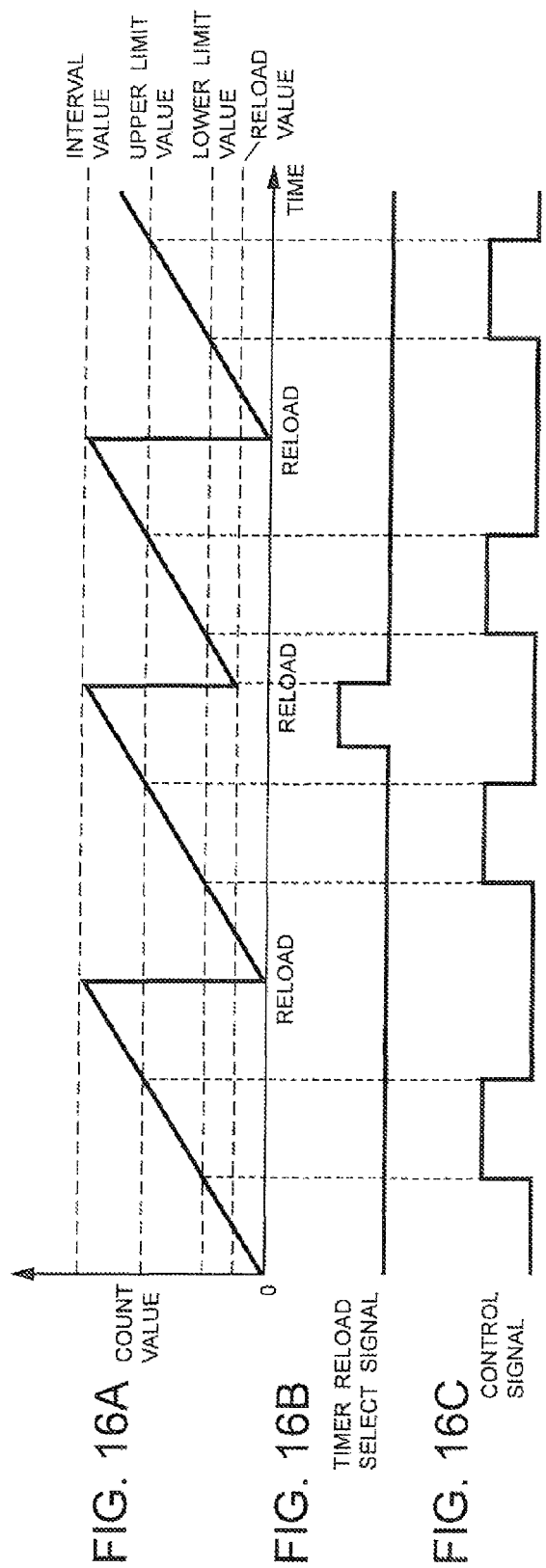
FIGS. 16A to 16C are diagrams showing the operation of the interval timer of FIG. 15.
Figure 17:
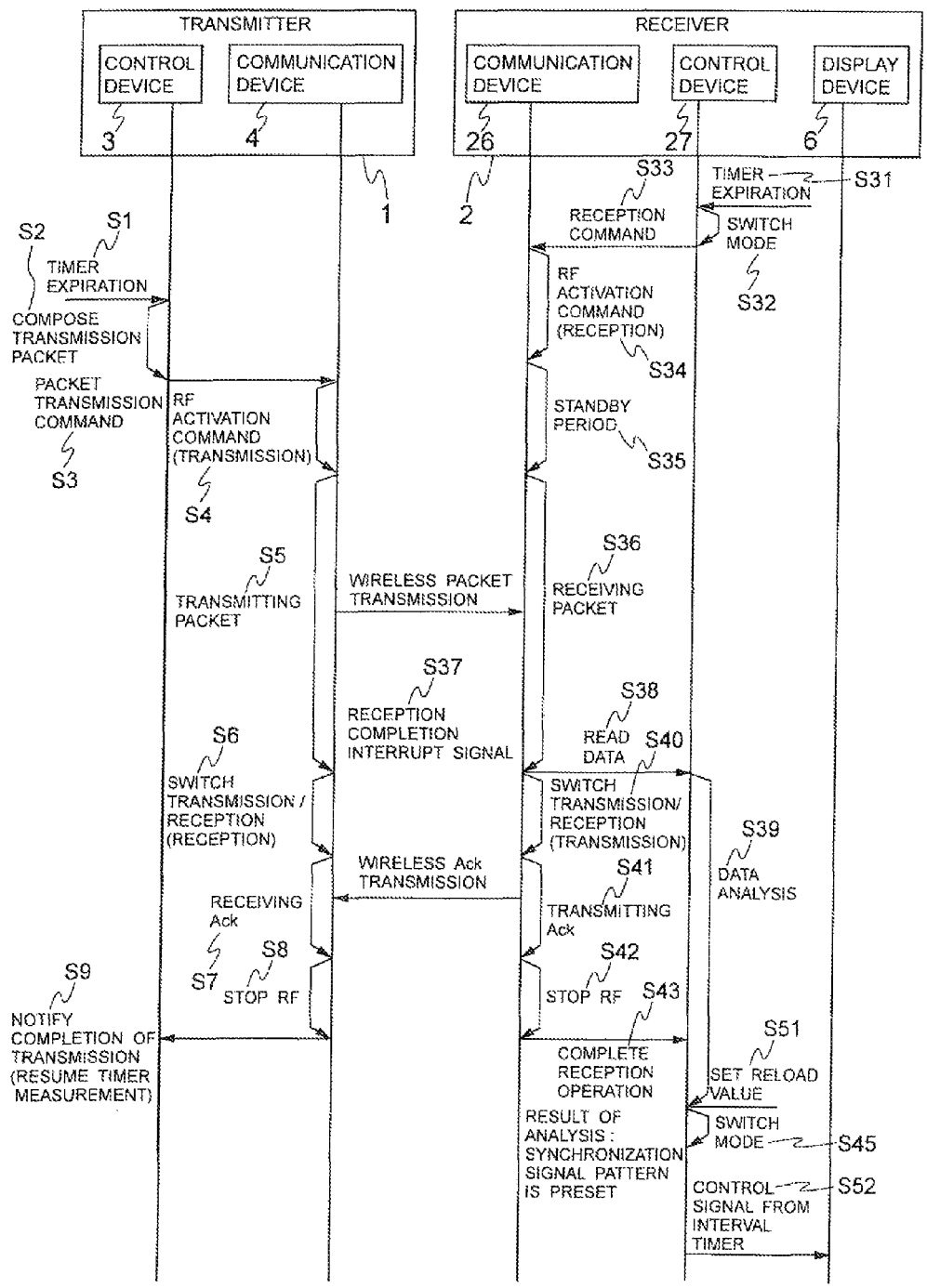
FIG. 17 is a sequence diagram showing the operation of the system of FIG. 13.

Next, the operation of the wireless communication system of FIG. 13 having such a configuration will be described with reference to FIGS. 16 and 17. FIG. 17 shows the operation sequence of the transmitter 1 and the receiver 2, in which the same operations as those of the sequence of FIG. 11 are designated by like reference numeral. A description of such operations will be omitted.

In the receiver 2, the control circuit 32 starts to analyze data stored in the RX_FIFO 16 at S39. If the result of data analysis shows that the data contains a synchronization signal pattern, the control circuit 32 inverts the level of the timer reload select signal from a low level to a high level and outputs the timer reload select signal to the interval timer 36 (S51 of FIG. 17).

As shown in FIG. 16A, when the count value of the counter 44 increases to reach the lower limit value of the lower limit register 45, the upper and lower limit comparator 48 generates the control signal of high level as shown in FIG. 16C. The control signal is supplied to the display device 6 through the general-purpose output port 13 (S52 of FIG. 17). Consequently, the display device 6 is controlled according to the control signal supplied from the interval timer 36.

When the count value of the counter 44 increases further to reach the upper limit value of the upper limit register 46, the comparator 48 stops generating the control signal of high level and outputs a low level.

As shown in FIG. 16A, when the count value of the counter 44 exceeds the upper limit value and increases further to reach the interval value of the interval register 47, the interval comparator 49 generates the timer expiration signal of high level. The timer expiration signal is supplied to the counter 44 as a reload command.

In response to the timer expiration signal, the counter 44 loads the initial value output from the selector 43, and starts counting clocks at the initial value. If the initial value at the time of occurrence of the timer expiration signal is the zero value, the counter 44 resume counting from the initial value of 0. On the other hand, immediately after it is determined by the result of data analysis that the data contains a synchronization signal pattern, the selector 43 outputs the reload value due to the timer reload select signal of high level as shown in FIG. 16B. The counter 44 then resume counting from the reload value as shown in FIG. 16A.

Since the timer expiration signal is supplied to the control circuit 32, the control circuit 32 inverts the level of the timer reload select signal from a high level to a low level and outputs the timer reload select signal to the selector 43 according to the timer expiration signal. In response to the low level of the timer reload select signal, the selector 43 supplies the zero value to the counter 44 as an initial value. The timer reload select signal is maintained at the low level unless the result of data analysis of the control circuit 32 shows that the data contains a synchronization signal pattern. When the count value of the counter 44 reaches the interval value and the interval comparator 49 generates the timer expiration signal of high level, the counter 44 resume counting from the initial value of 0 in response to the timer expiration signal. This makes it possible to continue generating the control signal in each interval period.

In the embodiment described above, when the control circuit 32 determines by data analysis that the data contains a synchronization signal pattern, the counter 44 resume counting from the reload value. The reload value is a count value that is greater than zero and is equivalent to the time taken for the data analysis. Consequently, the time when the count value of the counter 44 reaches the lower limit value to generate the control signal and the time when the count value reaches the upper limit value to stop generating the control signal can be set without as much delay as time taken for the data analysis after the completion of the reception of the packet. This enables accurate control of the display unit 6.

In the foregoing embodiment, operations that have been processed in a conventional communication device are performed by the control circuit 32 and the interval timer 36 in the control device 29 for load distribution. Since a high-speed high-load CPU need not be used for the control circuit 28 in the communication device 26, it is possible to reduce the power consumption of the receiver. Use of a high-speed CPU leads to increased power consumption even in periods other than data transmission and reception. The non-use of such a CPU for the control circuits can reduce the power consumption of the receiver in the period other than data transmission and reception. In the period between the end of data analysis and the start of the reception of a next packet, the control circuit 32 in the control device 29 operates in the low power consumption mode without a control operation on the display device 6, so that there occurs little load. The control operation is performed by the interval timer 36 instead, which allows a significant reduction in the current consumption of the receiver 2. It is therefore possible to reduce the power consumption of the receiver 2.

In the embodiment, it is possible to continue generating the control signal in each interval period even if it is not determined by the result of data analysis that the data contains a synchronization signal pattern. Packets therefore need not be transmitted from the transmitter 1 in every interval period, but may be transmitted from the transmitter 1 intermittently.

The foregoing embodiment has dealt with a wireless communication system in which the transmitter 1 transmits packets as a wireless signal, the packets containing a synchronization signal pattern as data, and the receiver 2 receives the packets transmitted as the wireless signal and extracts data from the packets. However, the present invention is not limited thereto and may be applied to a wired communication system in which packets are transmitted as a wired signal through transmission lines such as cables.

The foregoing embodiment has dealt with the case where the reload value is fixed. However, the reload value may be changed according to the time taken for the data analysis by the control circuit 32. More specifically, the reload value may be made equal to the number of clocks equivalent to the time taken for the control circuit 32 to analyze data.

Figure 18:
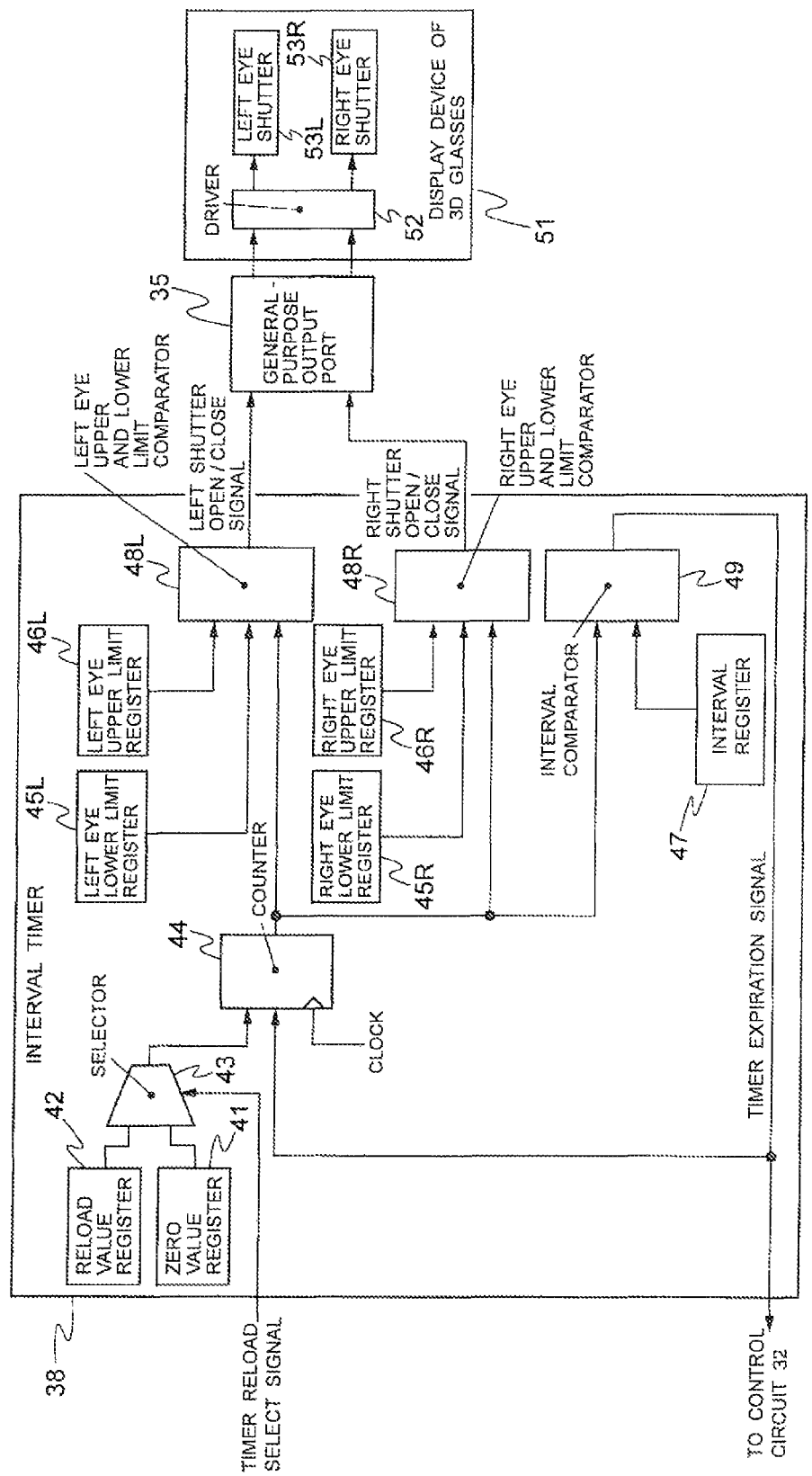
FIG. 18 is a block diagram showing a part of the internal configuration of a receiver that is provided with a display device of 3D glasses.

FIG. 18 shows a part of the internal configuration of a receiver 2 that is implemented in 3D glasses as a concrete example of the application of the present invention to a 3D video display system. The receiver 2 includes an interval timer 38 shown in FIG. 18 instead of the interval timer 36 of the control device 29 shown in FIG. 14. The interval timer 38 includes: a left eye lower limit register 45L, a left eye upper limit register 46L, and a left eye upper and lower limit comparator 48L which correspond to a left eye shutter 53L of a display device 51 of the 3D glasses; and a right eye lower limit register 45R, a right eye upper limit register 46R, and a right eye upper and lower limit comparator 48R which correspond to a right eye shutter 53R. The other components of the interval timer 38, namely, the zero value register 41, reload value register 42, selector 43, counter 44, interval register 47, and interval comparator 49 are the same as those of the interval timer 36.

With the configuration shown in FIG. 18, when the count value of the counter 44 increases to reach a left eye lower limit value of the left eye lower limit register 45L, the left eye upper and lower limit comparator 48L generates a left shutter open/close signal of high level as a control signal. The left shutter open/close signal of high level is supplied to the display device 51 through the general-purpose output port 13. In response to the left shutter open/close signal, a driver 52 drives the left eye shutter 53L to open. When the count value of the counter 44 increases further to reach a left eye upper limit value of the left eye upper limit register 46L, the left eye upper and lower limit comparator 48L stops generating the left shutter open/close signal of high level and outputs a low level. In response to the left shutter open/close signal of low level, the driver 52 stops driving the left eye shutter 53L to open, so that the left eye shutter 53L enters a closed state.

When the count value of the counter 44 exceeds the left eye upper limit value and increases further to reach a right eye lower limit value of the right eye lower limit register 45R, the right eye upper and lower limit comparator 48R generates a right shutter open/close signal of high level as a control signal. The right shutter open/close signal of high level is supplied to the display device 51 through the general-purpose output port 13. In response to the right shutter open/close signal, the driver 52 drives the right eye shutter 53R to open. When the count value of the counter 44 increases further to reach a right eye upper limit value of the right eye upper limit register 46R, the right eye upper and lower limit comparator 48R stops generating the right shutter open/close signal of high level and outputs a low level. In response to the right shutter open/close signal of low level, the driver 52 stops driving the right eye shutter 53R to open, so that the right eye shutter 53R enters a closed state.

When the count value of the counter 44 exceeds the right eye upper limit value and increases further to reach the interval value of the interval register 47, the interval comparator 49 generates a timer expiration signal of high level. The timer expiration signal is supplied to the counter 44, so that the counter 44 resumes counting up at the initial value selected by the selector 43 again (zero value or reload value). The other operations are the same as in the foregoing embodiment. A further description will thus be omitted.

As described above, when the present invention is applied to a 3D video display system, the left eye shutter and the right eye shutter each can be controlled to open and close without delay with reference to the timing of the completion of packet reception, even if it takes time to perform data analysis for identifying that the data contains a synchronization signal pattern after the completion of the reception. The communication device need not include a control circuit that makes high-speed operations for identifying the presence of a synchronization signal pattern in a received packet by data analysis after the completion of the reception of the packet. This allows a reduction in power consumption.

The receiver, the shutter glasses, and the communication system according to the present invention are not limited to the configuration of the foregoing embodiment. Other elements and/or methods may be further added. The foregoing embodiment has dealt with the case where the device to be controlled is a display device which includes shutters for providing display in synchronization with the reference timing signal transmitted from the transmitter. However, the present invention is not limited thereto, and may be applied to other devices that operate on the receiver side in synchronization with a reference timing signal transmitted from a transmitter.

This application is based on Japanese Patent Application No. 2011-078045 which is incorporated herein by reference.

What is claimed is:

1. A receiver comprising:
a communication device which receives data incoming intermittently;
a first control circuit which analyzes the data received by the communication device to identify whether or not a predetermined reference timing signal pattern is present in the data; and
a timer part which counts a clock from an initial value, generating a control signal for a device to be controlled according to a resulting count value, and if the count value reaches a predetermined interval value, resumes counting the clock at the initial value, the timer part changing the initial value to reduce a count of the clock between the initial value and the interval value if the first control circuit identifies the predetermined reference timing signal pattern to be present.

2. The receiver according to claim 1, wherein if the first control circuit identifies the predetermined reference timing signal pattern to be present, the initial value is changed as much as the number of clocks corresponding to time taken for the first control circuit to analyze the data.

3. The receiver according to claim 1, wherein:
the timer part includes
a first register which retains a first reference value,
a second register which retains a second reference value greater than the first reference value,
a selector which outputs the first reference value if the first control circuit does not identify the predetermined reference timing signal pattern to be present in the data, and outputs the second reference value instead of the first reference value if the first control circuit identifies the predetermined reference timing signal pattern to be present,
a counter which counts the clock from the initial value,
an upper and lower limit comparator which generates the control signal when the count value of the counter reaches a lower limit value greater than the initial value, and stops generating the control signal when the count value of the counter reaches an upper limit value greater than the lower limit value, and
an interval comparator which generates a timer expiration signal when the count value of the counter reaches the interval value, the interval value being greater than the upper limit value; and
in response to the timer expiation signal, the counter reads an output value of the selector as the initial value and resumes counting the clock at the initial value.

4. The receiver according to claim 2, wherein:
the timer part includes
a first register which retains a first reference value,
a second register which retains a second reference value greater than the first reference value,
a selector which outputs the first reference value if the first control circuit does not identify the predetermined reference timing signal pattern to be present in the data, and outputs the second reference value instead of the first reference value if the first control circuit identifies the predetermined reference timing signal pattern to be present,
a counter which counts the clock from the initial value,
an upper and lower limit comparator which generates the control signal when the count value of the counter reaches a lower limit value greater than the initial value, and stops generating the control signal when the count value of the counter reaches an upper limit value greater than the lower limit value, and
an interval comparator which generates a timer expiration signal when the count value of the counter reaches the interval value, the interval value being greater than the upper limit value; and
in response to the timer expiation signal, the counter reads an output value of the selector as the initial value and resumes counting the clock at the initial value.

5. The receiver according to claim 1, wherein the first control circuit operates according to a first clock in a period from when the first control circuit finishes analyzing the data to when the count value reaches the interval value, and operates according to a second clock having a frequency higher than that of the first clock while analyzing the data.

6. The receiver according to claim 1, wherein
the communication device includes:
a radio frequency unit which receives a wireless signal and outputting a reception signal in a reception state, and transmits a transmission signal to be transmitted as a wireless signal in a transmission state;
a demodulator which demodulates the reception signal received by the radio frequency unit into a digital signal;
a modulator which modulates transmission data in units of packets into the transmission signal;

a transmission and reception circuit that includes a reception system circuit which performs data processing on an output digital signal of the demodulator in the units of packets, and a transmission system circuit which supplies transmission data to the modulator in the units of packets; and a second control circuit which controls the transmission and reception circuit.

7. Shutter glasses having a right eye shutter and a left eye shutter, the shutter glasses comprising:

a communication device which receives data incoming intermittently;

a first control circuit which analyzes the data received by the communication device to identify whether or not a predetermined reference timing signal pattern is present in the data; and a timer part which counts a clock from an initial value, generates control signals for opening and closing the respective right and left eye shutters according to a resulting count value, and if the count value reaches a predetermined interval value, resumes counting the clock at the initial value, the timer part changing the initial value to reduce a count of the clock between the initial value and the interval value if the first control circuit identifies the predetermined reference timing signal pattern to be present.

8. The shutter glasses according to claim 7, wherein as the control signals, the timer part generates a left shutter open/close signal of high level in order to open the left eye shutter when the count value reaches a left eye lower limit value, generates the left shutter open/close signal of low level when the count value reaches a left eye upper limit value greater than the left eye lower limit value, generates a right shutter open/close signal of high level in order to open the right eye shutter when the count value reaches a right eye lower limit value greater than the left eye upper limit value, and generates the right shutter open/close signal of low level when the count value reaches a right eye upper limit value greater than the right eye lower limit value.

9. The shutter glasses according to claim 7, wherein the left eye shutter and the right eye shutter are each composed of a liquid crystal display.

10. The shutter glasses according to claim 8, wherein the left eye shutter and the right eye shutter are each composed of a liquid crystal display.

11. A communication system comprising:

a transmitter which intermittently transmits data containing a predetermined reference timing signal pattern; and a receiver that includes a communication device which receives the data, the receiver including a first control circuit which analyzes the data received by the communication device to identify whether or not the predetermined reference timing signal pattern is present in the data, and a timer part which counts a clock from an initial value, generates a control signal for a device to be controlled according to a resulting count value, and if the count value reaches a predetermined interval value, resumes counting the clock at the initial value, the timer part changing the initial value to reduce a count of the clock between the initial value and the interval value if the first control circuit identifies the predetermined reference timing signal pattern to be present.

12. The communication system according to claim 11, wherein:

the timer part includes a first register which retains a first reference value, a second register which retains a second reference value greater than the first reference value, a selector which outputs the first reference value if the first control circuit does not identify the predetermined reference timing signal pattern to be present in the data, and outputs the second reference value instead of the first reference value if the first control circuit identifies the predetermined reference timing signal pattern to be present, a counter which counts the clock from the initial value, an upper and lower limit comparator which generates the control signal when the count value of the counter reaches a lower limit value greater than the initial value, and stops generating the control signal when the count value of the counter reaches an upper limit value greater than the lower limit value, and an interval comparator which generates a timer expiration signal when the count value of the counter reaches the interval value, the interval value being greater than the upper limit value; and in response to the timer expiation signal, the counter reads an output value of the selector as the initial value and resumes counting the clock at the initial value.

13. The communication system according to claim 11, wherein:

the transmitter transmits the data according to timing into which transmission timing of the data at predetermined cycles is thinned out; and the predetermined cycles have a time length such that the count value changes from the first reference value to the interval value.

* * * * *